(No Model.) 2 Sheets—Sheet 1.

E. O., W. O. & H. S. LONG.
HAY ELEVATOR.

No. 365,528. Patented June 28, 1887.

WITNESSES:

INVENTOR:
E. O. Long
W. O. Long
H. S. Long
BY Munn & Co.
ATTORNEYS.

(No Model.) 2 Sheets—Sheet 2.

E. O., W. O. & H. S. LONG.
HAY ELEVATOR.

No. 365,528. Patented June 28, 1887.

WITNESSES:
Otto Berger
A. E. Brinkerhoff

INVENTOR:
E. O. Long
W. O. Long
H. S. Long
BY Munn & Co
ATTORNEYS.

UNITED STATES PATENT OFFICE.

ELLIS O. LONG, WILLIARD O. LONG, AND HERBERT S. LONG, OF HAYESVILLE, OHIO.

HAY-ELEVATOR.

SPECIFICATION forming part of Letters Patent No. 365,528, dated June 28, 1887.

Application filed July 24, 1886. Serial No. 209,023. (No model.)

*To all whom it may concern:*

Be it known that we, ELLIS O. LONG, WILLIARD O. LONG, and HERBERT S. LONG, all of Hayesville, in the county of Ashland and State of Ohio, have invented a new and Improved Hay and Grain Elevator, of which the following is a full, clear, and exact description.

This invention relates to apparatus adapted to raise loads of hay or grain in a store-house or barn and dump them into a mow at one side of the driveway of the building; and the invention has for its object to provide a simple and effective apparatus of this character, which may be handled easily to house the crop with economy of time and labor.

The invention consists in certain novel features of construction and combinations of parts of the hay and grain elevator, all as hereinafter fully described and claimed.

Reference is to be had to the accompanying drawings, forming a part of this specification, in which similar letters of reference indicate corresponding parts in all the figures.

Figure 1:
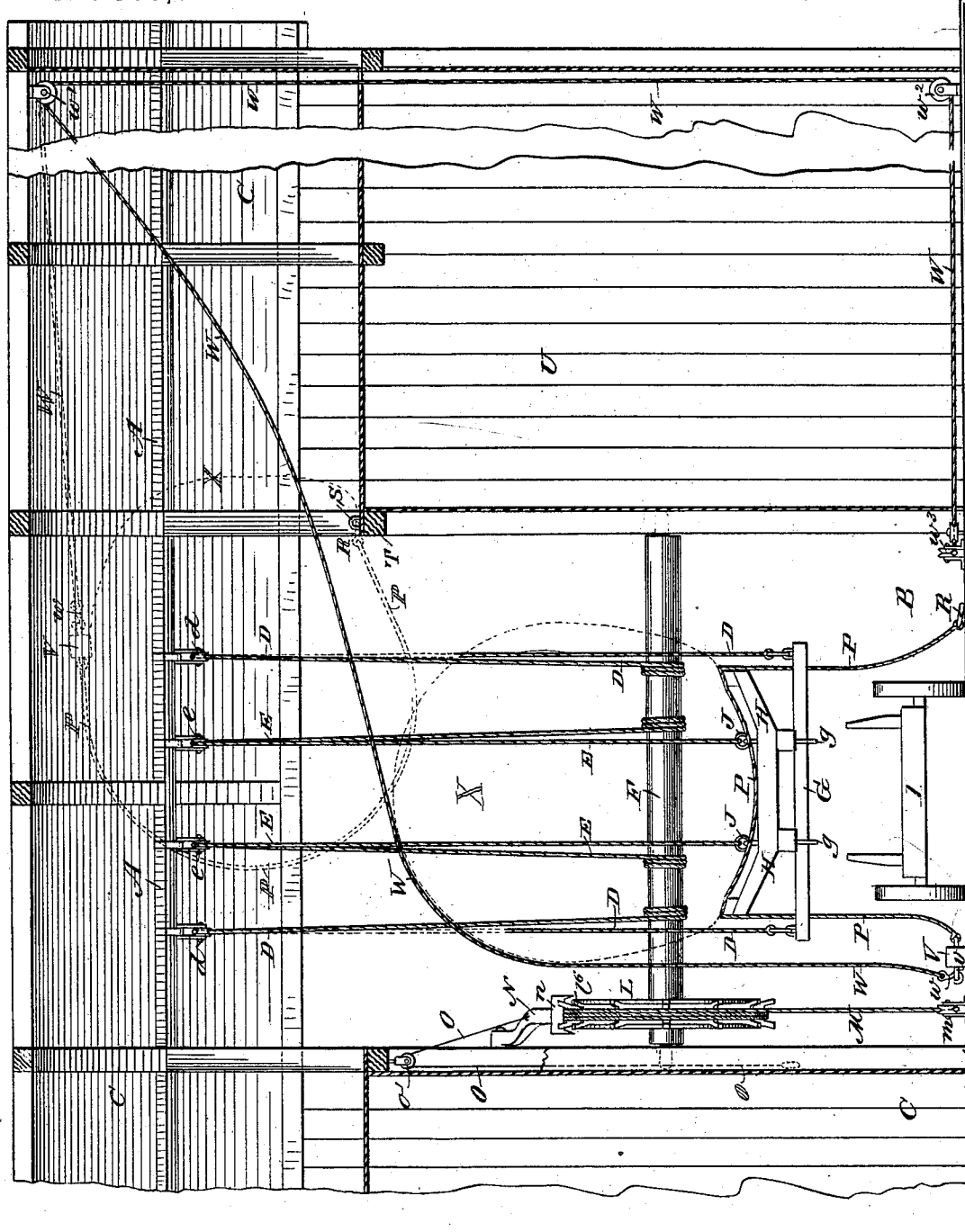
Figure 2:
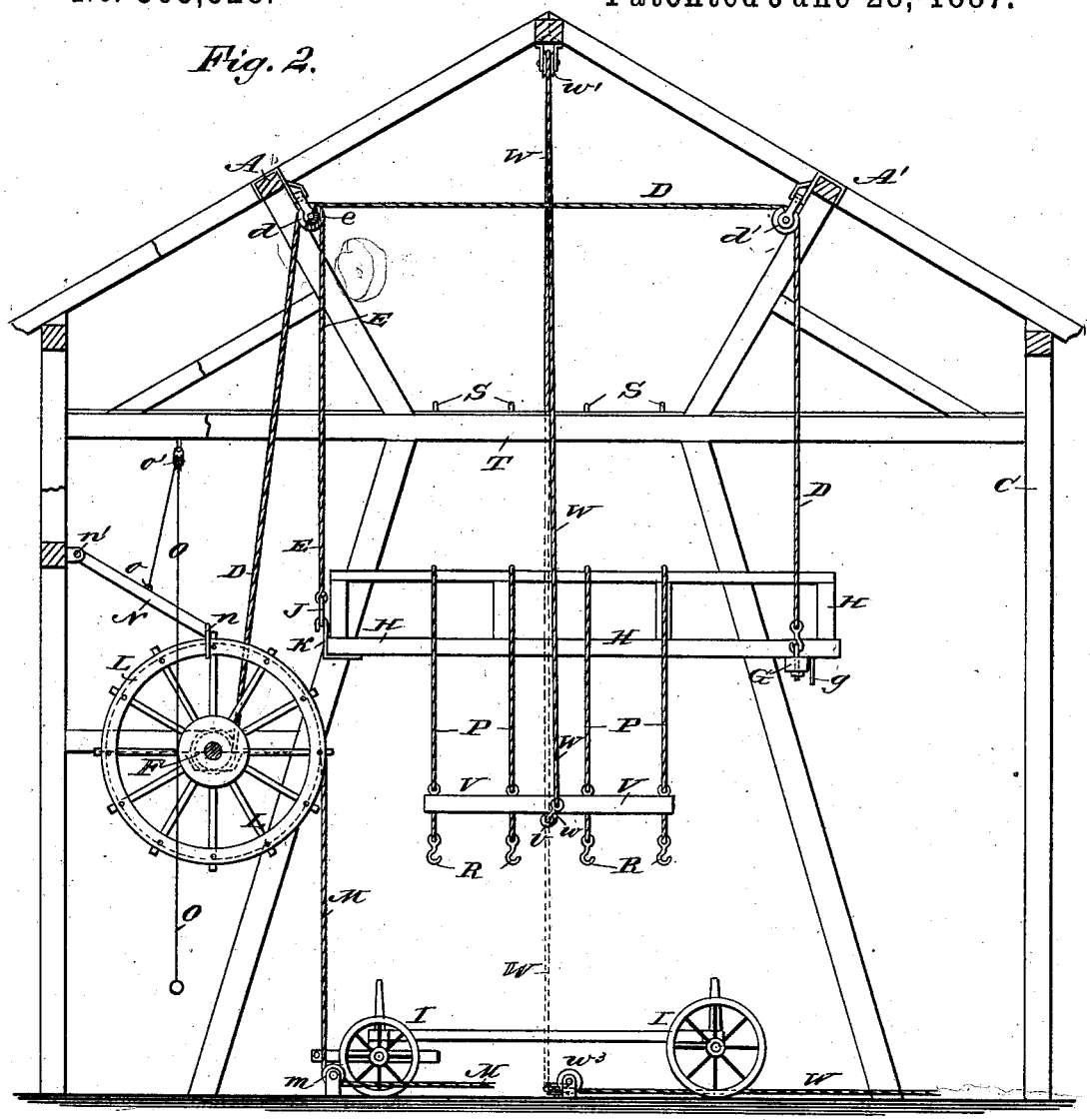
Figure 3:
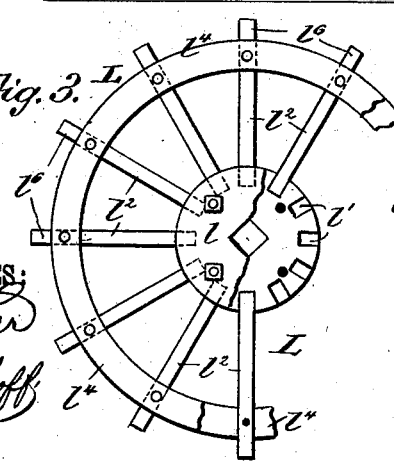
Figure 4:
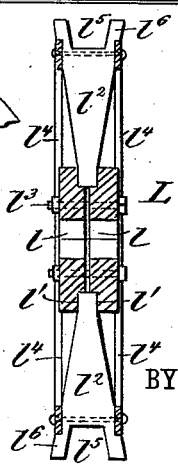

Figure 1 is a longitudinal vertical sectional elevation, partly broken away, of one end of a barn fitted with my improved hay and grain elevator, the wagon hay-rack and its load being shown partly lifted in full lines and the manner of dumping the load into the mow being indicated in dotted lines. Fig. 2 is a transverse sectional elevation through the barn at the driveway, and shows the wagon hay-rack raised nearly to the place for dumping its load; and Figs. 3 and 4 are detail views of the hoist-wheel of the elevator.

To a roof or other timber, A, over the driveway B of the barn C, there are held by hooks, or otherwise, two pairs of pulleys or sheaves, $d$ $d$ and $e$ $e$, respectively, and to a like timber, A', crossing the driveway overhead, there are held two pulleys or sheaves, $d'$ $d'$.

Two hoisting-ropes, D D, are passed over the pulleys $d$ $d$, and these ropes are attached at one end to a shaft, F, which crosses the driveway B, and is journaled at the ends in suitable bearings fixed to the frame of the barn. The other ends of the ropes D D, which hang down from the pulleys $d'$ $d'$, are attached to a cross-bar, G, adapted to be placed under one end of the hay or grain rack H, which is the body or top of a wagon, and may be lifted from the wagon running gear I when the wagon is drawn into the barn driveway B. Pins $g$ $g$, driven into the bottom of the rack H, prevent slipping of the cross bar G from beneath the rack. Two hoisting-ropes, E E, are passed over the pulleys $e$ $e$, and are attached at one end to the elevator-shaft F, and at their other ends are provided with rings or links J, which may be engaged with hooks K, fixed to one end of the hay-rack H.

To the elevator-shaft F there is fixed a hoist-wheel, L, to the periphery of which is attached one end of a hoisting-rope, M, which may be wound upon the wheel, and extends therefrom to and beneath a pulley, $m$, fixed to the barn-floor at one side of the driveway B, and from this pulley $m$ the rope M extends, to receive a ring or other device, allowing a horse to be hitched to the rope for working the elevator.

I make the hoist-wheel L with a hub formed in two opposite side parts, $l$ $l$, having opposing notches $l'$, into which the inner ends of the wheel-spokes $l^2$ are fitted, and whereby, when the parts are drawn together or toward each other by bolts $l^3$, the spokes will be firmly held to the hub. The hub has a square central hole, to fit a squared part of the shaft F. The outer ends of the hoist-wheel spokes $l^2$ are tied to each other by two opposite circular side rims or plates, $l^4$ $l^4$, which are bolted to the spokes a little distance inside of the outer extremities of the spokes, in which are formed the concavities or recesses $l^5$, to receive the hoisting-rope M.

The projecting ends $l^6$ of the wheel-spokes $l^2$ form lugs or stops, against which a brake-beam, N, hinged to the barn-frame at $n'$, may act to prevent turning back of the hoist-wheel and hold the load elevated, as presently described. The end or head of the brake-beam N, which acts on the hoist-wheel, is provided with a plate, $n$, having opposite side lugs, which stand one outside of each side rim $l^4$ of the wheel and hold the beam in proper position for action of it on the wheel-spokes. A cord or chain, O, connected at $o$ to the brake-beam N, is passed over a pulley, $o'$, and hangs therefrom to or near the ground, and may be drawn upon to lift the brake-beam from the wheel-spokes to allow the hay-rack to be lowered.

Before the hay or grain is loaded onto the wagon-rack H in the field I lay across the rack four or more ropes, P, which have hooks R at one end, adapted to be engaged with eyes or staples S, fixed to a cross-beam, T, of the barn-frame, at one side of the driveway and between it and the mow U, into which the hay or grain is to be dumped. The other ends of all the ropes P are fixed to a bar, V, which has an eye or staple, $v$, with which a hook, $w$, on the end of a rope or chain, W, may be engaged. This rope W leads from the driveway B upward and along the barn to and over a pulley, $w'$, hung at the farther end of the barn, next or near the roof, and thence the rope W passes down along the end of the barn to a floor-pulley, $w^2$, and thence to the driveway B, where the rope passes between guide-pulleys $w^3$, and thence along the driveway at the opposite side of it from the hoisting-rope M, and at its end the rope W will have a ring or other device, to which a horse may be hitched, preferably the same horse that draws the hoisting-rope M.

The operation is as follows: The hay or grain X having been loaded on the hay-rack H of the wagon and over the ropes P, laid across the rack, the wagon will be drawn into the barn-driveway. The hoisting-rope cross-bar G then will be set beneath the rack H, inside of the guard-pins $g$, and the hoisting-ropes E will be engaged with the hooks K at the other end of the rack. The hook $w$ of the dumping-rope W will also be engaged with the eye $v$ of the cross-bar V, connected to ropes P. The horse, hitched to rope M, will now be made to draw on said rope, and thereby turn the wheel L and shaft F, and wind the ropes D E on said shaft, to raise the wagon-rack H about level with the barn-beam T, and the brake-bar N will hold up the rack and its load by engaging the spoke ends $l^6$ of the hoist-wheel L. The hooks R on the ropes P will now be engaged with the eyes or staples S on the beam T, and the horse will be hitched to the rope W, and by drawing thereon the entire load X will be turned over out of the wagon-rack H into the mow U at one side of the driveway, and as will be understood from the upper dotted lines in Fig. 1 of the drawings. After discharge of the load of hay or grain into the mow, as above described, the ropes P will be thrown over backward across the raised rack H, and will be unhooked from the eyes S, and the brake N will be raised from the hoist-wheel L by pulling on the rope O, and the hay-rack H and ropes P and the hook end $w$ of rope W will descend, and the rack H will take its place on the wagon running-gear I. The hook $w$ of rope W then will be disengaged from the eye $v$ of the cross-bar V, and the wagon is ready to be drawn from the barn to receive another load, and the elevator is ready to raise the next load and dump it into the mow.

It is obvious that the elevator will raise the wagon-rack H to allow its load to be discharged by hand-forks from the rack into the mow; but by providing the hay-sling P R V and loading the wagon-rack on the ropes P the whole load may be dumped from the hay-rack at once, as above described, thereby largely economizing labor in housing the crop, as a few men will be able to do the work of many using hand-forks to pitch the hay or grain into the mow from a wagon standing on the floor of the barn.

A canvas or other fabric may be used instead of the ropes P, as will readily be understood.

Having thus fully described our invention, we claim as new and desire to secure by Letters Patent—

1. The combination, in a hay and grain elevator, of ropes D D and E E, provided at one of their ends with a cross-bar, G, and rings J, respectively, a detachable wagon body or rack, H, having pins $g$ and hooks K at opposite ends, overhead pulleys $d\ d\ d'\ d'$ and $e\ e$, over which the ropes D E are passed, a shaft, F, to which the other ends of these ropes are connected, a hoist-wheel, L, on said shaft, and a rope, M, passing from wheel L and adapted to be drawn upon for hoisting the loaded rack, substantially as described, for the purposes set forth.

2. The combination, in a hay and grain elevator, of ropes D D E E, provided at one of their ends with devices adapted to suspend the load, overhead pulleys $d\ d\ d'\ d'$ and $e\ e$, over which the ropes D D and E E are passed, a shaft, F, to which the other ends of these ropes are connected, a hoist-wheel, L, on said shaft, a rope, M, passing from wheel L and adapted to be drawn upon for hoisting the load, and a brake-beam, N, engaging the hoist-wheel, and provided with the plate $n$, having the depending side lugs extending at opposite sides of the wheel to prevent lateral movement of the brake-bar, substantially as described, for the purposes set forth.

3. The hoist-wheel L, composed of a hub formed of opposite side parts, $l\ l$, provided with sockets $l'\ l'$, spokes $l^2$, placed in these sockets, bolts $l^3$, securing the hub and spokes, and opposite side rims, $l^4\ l^4$, fixed to the spokes near their outer ends, and the spokes formed with rope receiving concavities $l^5$, substantially as shown and described.

ELLIS O. LONG.
WILLIARD O. LONG.
HERBERT S. LONG.

Witnesses:
H. L. ARMENTROUT,
JOHN STEEL,
O. H. REED.